United States Patent
Takahashi et al.

[11] Patent Number: 5,807,532
[45] Date of Patent: Sep. 15, 1998

[54] METHOD OF PRODUCING SPINEL TYPE LIMN2O4

[75] Inventors: Koh Takahashi; Takeshi Sotomura; Keiji Satoh, all of Ibaraki, Japan

[73] Assignee: Japan Metals and Chemicals Co., Ltd., Tokyo, Japan

[21] Appl. No.: 704,754

[22] PCT Filed: Jan. 25, 1996

[86] PCT No.: PCT/JP96/00136

§ 371 Date: Sep. 24, 1996

§ 102(e) Date: Sep. 24, 1996

[87] PCT Pub. No.: WO96/22943

PCT Pub. Date: Aug. 1, 1996

[30] Foreign Application Priority Data

Jan. 26, 1995 [JP] Japan .................................. 7-028867

[51] Int. Cl.⁶ ............................................. C01G 45/12
[52] U.S. Cl. ........................................ 423/599; 423/593
[58] Field of Search ........................... 423/593, 594, 423/599

[56] References Cited

U.S. PATENT DOCUMENTS

| | | |
|---|---|---|
| 2,562,705 | 7/1951 | Ellestad et al. .................. 423/599 |
| 4,567,031 | 1/1986 | Riley ............................... 423/594 |
| 5,370,948 | 12/1994 | Hasegawa et al. ................ 423/594 |
| 5,567,401 | 10/1996 | Doddapaneni et al. ........... 423/594 |

FOREIGN PATENT DOCUMENTS

| | | |
|---|---|---|
| 2-9722 | 1/1990 | Japan . |
| 155628 | 6/1993 | Japan ............................ 423/599 |
| 270838 | 10/1993 | Japan ............................ 423/599 |
| 6-275276 | 9/1994 | Japan . |

OTHER PUBLICATIONS

English langauge abstract of JP No. 2–9722.
English langauge abstract of JP No. 6–275276.

*Primary Examiner*—Wayne Langel
*Attorney, Agent, or Firm*—Greenblum & Bernstein P.L.C.

[57] ABSTRACT

As a technique of stably producing a crystalline spinel type $LiMn_2O_4$ having a large specific surface area by microscopically uniform mixing at atomic level of constitutional elements without causing crystal defects, there is proposed a method wherein water-soluble lithium salt and manganese nitrate ($Mn(NO_3)_2$) are dissolved in water and then non-ion water-soluble high polymer containing no metal ion is added as a cation carried body to the resulting aqueous mixed solution and thereafter water is removed from the aqueous mixed solution under heating, preferably at a temperature of not lower than 100° C. to synthesize crystalline spinel type $LiMn_2O_4$.

13 Claims, 3 Drawing Sheets

METHOD OF PRODUCING SPINEL TYPE LIMN204

TECHNICAL FIELD

This invention relates to a method of producing spinel type $LiMn_2O_4$, and more particularly to a method of producing spinel type $LiMn_2O_4$ usable for use in a cathode material for secondary lithium battery, a matrix for lithium adsorbent or the like.

BACKGROUND ART

As a starting material for $LiMn_2O_4$, there is used a manganese compound being rich in source and cheap in the cost. Therefore, $LiMn_2O_4$ is lately watched as an alternative material of $LiCoO_2$ being a cathode material for high-voltage and high-energy density type secondary lithium battery.

In general, it is known that a specific surface area of the cathode material for the secondary lithium battery is an important factor determining a discharge capacity of the secondary lithium battery. That is, as the specific surface area of the cathode material becomes large, the reaction area of the battery becomes larger, so that it is said that the movement of ion is smooth and hence the decrease of capacity to the charge and discharge under heavy load is less.

Now, when $LiMn_2O_4$ of amorphous strain spinel structure synthesized by firing at a low temperature is used as a cathode material for the secondary lithium battery, the discharge capacity is small though the specific surface area is large.

Therefore, it is desirable to use $LiMn_2O_4$ having a large specific surface area and a crystalline spinel structure as the cathode material for high-voltage and high-energy density type secondary lithium battery.

Heretofore, crystalline spinel type $LiMn_2O_4$ has been synthesized by dry-mixing lithium salt and manganese salt, for example, lithium carbonate and manganese oxide ($Mn_2O_3$) or lithium carbonate and manganese carbonate at an atomic ratio of 1:2 and then firing the resulting mixed powder in an oxidizing atmosphere.

In the conventional process of producing $LiMn_2O_4$, however, there are the following drawbacks:

①. $Mn_2O_3$ is produced as an intermediate. This $Mn_2O_3$ reacts with lithium carbonate to synthesize $LiMn_2O_4$ of spinel structure. Therefore, the sintering of $Mn_2O_3$ proceeds before the synthesis of $LiMn_2O_4$ and hence the specific surface area of $LiMn_2O_4$ lowers.

②. The starting powder is usually large in the particle size. Therefore, BET specific surface area of $LiMn_2O_4$ after the firing is as very small as not more than 1 $m^2/g$.

③. The above dry-mixing is solid-solid mixing, so that microscopically uniform mixing is impossible at atomic or molecular level. Therefore, $LiMn_2O_4$ obtained by firing through solid phase reaction becomes unstable in the crystal structure and is apt to cause defects.

Therefore, it is actual that materials having sufficient charge and discharge cycle property are not obtained by the above conventional method.

On the other hand, there is proposed a technique that the sintering promotion of $Mn_2O_3$ (intermediate) resulting in the lowering of specific surface area is controlled by two-stage heat treatment of synthesizing $LiMn_2O_4$ of amorphous strain spinel structure through low-temperature firing (not higher than 450° C.) and then subjecting to reheating (600°–700° C.) to attempt the improvement in the specific surface area of According to such a conventional technique, the specific surface area of $LiMn_2O_4$ is improved. However, the method of producing $LiMn_2O_4$ according to the conventional technique is a dry treatment, so that it has drawbacks that the crystal structure of $LiMn_2O_4$ becomes unstable and the defects are liable to be caused. Therefore, it can not be expected that materials having sufficient charge and discharge cycle property are obtained by this method.

It is an object of the present invention to solve the above drawbacks and to establish a technique of stably producing a crystalline spinel type $LiMn_2O_4$ having a large specific surface area by microscopically uniform mixing of constitutional elements at a given atomic level without causing crystal defect.

It is another object of the present invention to establish a technique of surely producing spinel type $LiMn_2O_4$ having a large discharge capacity and excellent charge and discharge cycle property.

DISCLOSURE OF THE INVENTION

The inventors considered that the unstable formation of crystal results from ununiform mixing of starting materials and noticed the uniform mixing of liquid-liquid mixing system and have made various studies in order to attain the above objects. As a result, it has been found that the reaction between lithium ion and manganese ion in the uniform liquid-liquid mixing system can be promoted by adding a cation carried body to an aqueous mixed solution of water-soluble lithium salt and manganese nitrate ($Mn(NO_3)_2$) and then removing water from the aqueous mixed solution under heating and consequently the present invention has been accomplished.

That is, the method of producing spinel type $LiMn_2O_4$ according to the present invention is characterized in that ①. water-soluble lithium salt and manganese nitrate ($Mn(NO_3)_2$) are dissolved in water and then non-ion water-soluble high polymer containing no metal ion is added as a cation carried body to the resulting aqueous mixed solution and thereafter water is removed from the aqueous mixed solution under heating to synthesize crystalline spinel type $LiMn_2O_4$; and ②. water-soluble lithium salt and manganese nitrate ($Mn(NO_3)_2$) are dissolved in water and then non-ion water-soluble high polymer containing no metal ion is added as a cation carried body to the resulting aqueous mixed solution and thereafter water is removed from the aqueous mixed solution under heating to synthesize crystalline spinel type $LiMn_2O_4$ and further the synthesized $LiMn_2O_4$ is subjected to a heat treatment in air.

In the method according to the present invention, it is preferable that a high molecular weight compound easily causing nitro-formation and having OH group is used as the non-ion water-soluble high polymer.

In the method according to the present invention, it is further desirable that water is removed from the aqueous mixed solution under heating at a temperature of not lower than 100° C.

BEST MODE FOR CARRYING OUT THE INVENTION

Figure 1:
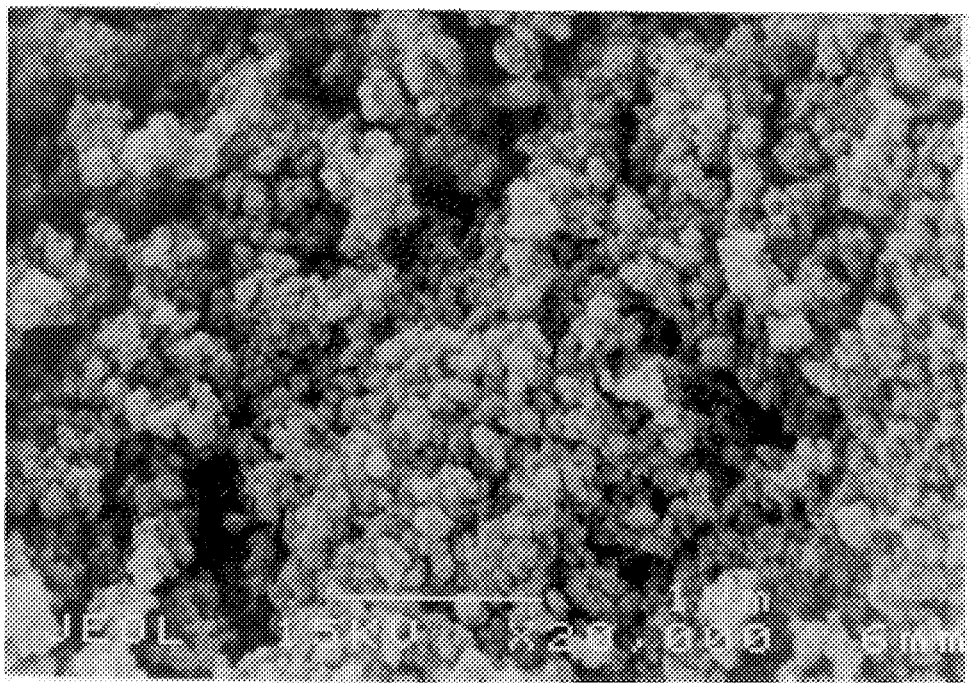
FIG. 1 is an electron micrograph (SEM) showing a particle structure of spinel type $LiMn_2O_4$ obtained by the method according to the present invention.

The characteristic of the present invention lies in that the non-ion water-soluble high polymer containing no metal ion is added as a cation carried body to the aqueous mixed solution of water-soluble lithium salt and manganese nitrate ($Mn(NO_3)_2$), while water is removed from the aqueous mixed solution under heating at a temperature of, preferably not lower than 100° C. When the heating temperature is lower than 100° C., the decomposition and burning of nitro compound are not caused and $LiMn_2O_4$ can not be synthesized, so that it is desirable that the heating temperature is not lower than 100° C. Moreover, when the heating temperature is enough to evaporate water and decompose the nitro compound, the upper limit is not particularly restricted. Therefore, the heating temperature differs in accordance with the water-soluble high polymer used, which is sufficient to be about 200° C. at most.

Thus, both lithium ion and manganese ion in the aqueous mixed solution are fixed to the cation carried body with the evaporation of water to render into a uniform state of easily causing reaction. On the other hand, nitric acid ion reacts with the cation carried body under heating to produce nitro compound. As a result, it is possible that as the heating is continued, the nitro compound is decomposed and burnt and lithium ion and manganese ion are reacted by the resulting heat energy to easily synthesize $LiMn_2O_4$.

The thus obtained crystalline spinel type $LiMn_2O_4$ powder is fine powder having a considerably large specific surface area. As a result, this powder is certainly large in the discharge capacity and excellent in the charge and discharge cycle property. However, the $LiMn_2O_4$ powder just after the synthesis contains C and N as impurities as shown in Table 1. For this end, when the $LiMn_2O_4$ powder is used as a cathode material for high-voltage and high-energy density type secondary lithium battery, it is more desirable to remove these impurities.

TABLE 1

| | Impurities | |
|---|---|---|
| | C (wt %) | N (wt%) |
| Just after synthesis | 2.87 | 0.92 |
| After heat treatment | 0.77 | 0.02 |

As the method of producing the impurity-removed spinel type $LiMn_2O_4$, another characteristic of the present invention lies in that the synthesized $LiMn_2O_4$ is subjected to a heat treatment in air in addition to the above synthesis reaction of $LiMn_2O_4$. In this case, it is desirable that the heat treatment is carried out at a temperature of at least not lower than 200° C. For example, it has been confirmed that when the heat treatment is carried out at 200° C. for 5 hours as shown in Table 1, C and N are about 0.8% and 0.02%. Moreover, the upper limit of the heat treating temperature is not particularly restricted, but it is sufficient to be not higher than the decomposition temperature of the synthesized $LiMn_2O_4$, e.g. not higher than 900° C.

Thus, there can be produced spinel type $LiMn_2O_4$ having more improved discharge capacity and charge and discharge cycle property.

As mentioned above, according to the method of the present invention, the synthesis of $LiMn_2O_4$ is possible at a temperature region lower than that of the conventional technique and hence the crystalline spinel type $LiMn_2O_4$ having a considerably large specific surface area can stably be produced without causing the defects. As a result, it is possible to stably produce spinel type $LiMn_2O_4$ having a large discharge capacity and excellent charge and discharge cycle property.

In the method according to the present invention, lithium nitrate, lithium sulfate, lithium chloride or the like may be used as the water-soluble lithium salt. Preferably, lithium nitrate ($LiNO_3$) is used. For, nitric acid ion decomposes at a low temperature, so that the removal is easy as compared with the other anion (sulfuric acid ion, chlorine ion or the like) and it does not remain in a fired product.

In the method according to the present invention, manganese nitrate ($Mn(NO_3)_2$) is used as a manganese source because the nitric acid ion in manganese nitrate reacts with the non-ion water-soluble high polymer as a cation carried body to easily produce the nitro compound.

The reason why the cation carried body is used in the method according to the present invention is due to the fact that when the cation carried body is not used, lithium salt and manganese nitrate are separated and precipitated by the difference of solubility accompanied with the evaporation of water from the aqueous mixed solution under heating.

The cation carried body is a substance having a function of holding and fixing a metal ion such as lithium ion, manganese ion or the like, and may be a non-ion water-soluble high polymer containing no metal ion. For example, there are starches such as wheat starch and the like; seaweeds such as mannan (konjak flour or the like), agar (agar-agar) and the like; plant sticky materials such as yam, gum arabic and the like; sticky material of microorganism such as dextrane and the like; protein natural polymer such as glue, gelatine and the like; celluloses such as viscose, methylcellulose (MC) and the like; starch semi-synthesized products such as soluble starch, dialdehyde starch and the like; and synthesized products such as polyvinyl alcohol (PVA) and the like. Particularly, it is preferable to use at least one organic substance easily causing nitro-formation and having OH group selected from PVA, MC, agar and the like. Moreover, the reason for the use of the non-ion water-soluble high polymer containing no metal ion is due to the fact that if the metal ion such as potassium, sodium or the like remains, compound other than $LiMn_2O_4$ is synthesized.

In the method according to the present invention, it is considered that the crystalline spinel type $LiMn_2O_4$ is synthesized by a reaction mechanism as mentioned below. That is, ①. At first, lithium ion and manganese ion in the aqueous mixed solution of water-soluble lithium salt and manganese nitrate ($Mn(NO_3)_2$) are gradually held and fixed to the cation carried body accompanied with the evaporation of water under heating to render into a uniform state of easily causing reaction with each other.

②. On the other hand, nitric acid ion in the aqueous mixed solution reacts with the cation carried body under heating to produce the nitro compound.

③. Then, the nitro compound carried with cation is decomposed and burnt under heating at, preferably, not lower than 100° C. to generate heat, and lithium ion and manganese ion are reacted by heat energy based on the decomposition burning to easily synthesize $LiMn_2O_4$.

(EXAMPLE 1)

At first, 0.1 mol of $LiNO_3$ and 0.2 mol of $Mn(NO_3)_2$ are dissolved in 178 ml of pure water to form an aqueous mixed solution. The aqueous mixed solution is heated and then added with 8 g of PVA as a cation carried body. Thereafter, the heating is continued to evaporate a certain amount of water, and then the solution is transferred to a drier of 150° C. to conduct heating and drying for 24 hours. As a result, black powder is obtained, which is confirmed to be a single spinel phase of $LiMn_2O_4$ as identified by X-ray diffraction.

Furthermore, observation of particulate shape through electron microscope (SEM) and measurement of specific surface area through BET process are carried out. The results are shown in FIG. 1 and Table 2. Moreover, a comparative example in Table 2 is an example of $LiMn_2O_4$ synthesized by solid-solid mixing (dry mixing).

As seen from results shown in FIG. 1, it has been found that the spinel type $LiMn_2O_4$ obtained by the method according to the present invention is fine particles (average particle size: 0.1 μm, uniform size).

As seen from results of Table 2, it has been found that the specific surface area of spinel type $LiMn_2O_4$ obtained by the method according to the present invention is considerably larger than that of $LiMn_2O_4$ synthesized by solid-solid mixing (dry mixing) according to the conventional technique.

TABLE 2

| | BET specific surface area |
|---|---|
| Example 1 (Invention example) | 28 $m^2/g$ |
| Solid-solid mixing (comparative example) | 0.79 $m^2/g$ |

(EXAMPLE 2)

Figure 2:
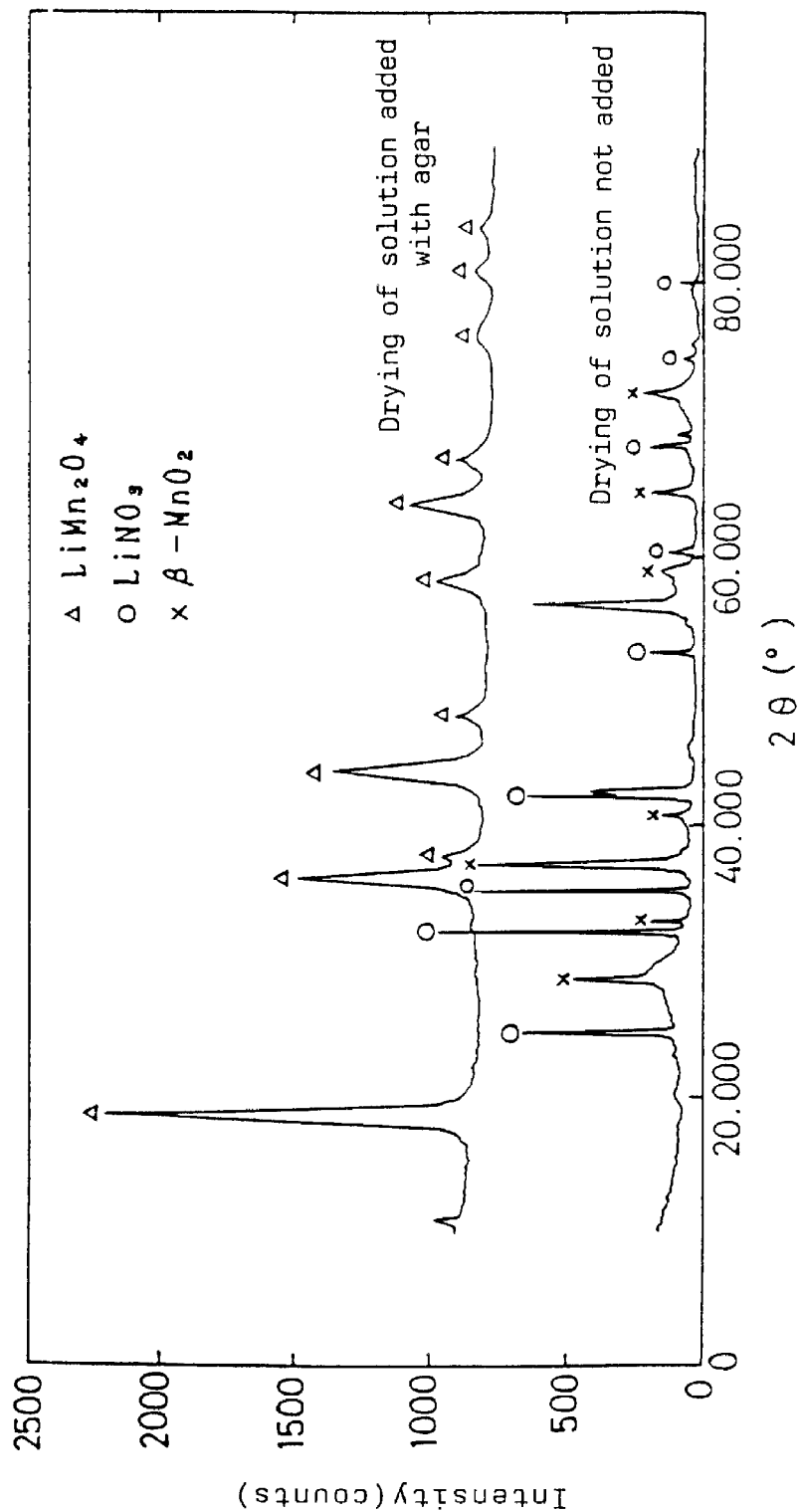
FIG. 2 is an X-ray diffraction pattern showing dry powder obtained by the method according to the present invention and dry powder obtained by a method unsuitable to the present invention.

The same procedure as in Example 1 is repeated except that agar is used as the cation carried body and the temperature in the drier is 100° C., whereby black powder is obtained. It has been confirmed that this black powder is a single spinel phase of $LiMn_2O_4$ as identified by X-ray diffraction (see FIG. 2). Moreover, an X-ray diffraction pattern of powder obtained by heating and drying without adding agar is also shown in FIG. 2 for comparison.

As seen from the results of this figure, it has been confirmed that when agar is not added, the phase separation is caused and hence the single spinel phase of $LiMn_2O_4$ is not obtained.

Furthermore, observation of particulate shape through electron microscope (SEM) and measurement of specific surface area through BET process are carried out, which results in the same as in Example 1.

The following examples will explain with respect to a case that $LiMn_2O_4$ powder obtained by removing impurities from $LiMn_2O_4$ synthesized powder through heat treatment is applied to a cathode material for secondary lithium battery.

(EXAMPLE 3)

At first, $LiMn_2O_4$ powder obtained in Example 1 is subjected to a heat treatment in air at 250° C. for 1 hour to obtain a cathode material powder for battery (cathode activated substance). Then, the cathode activated substance is mixed with carbon as a conductor and polytetrafluoro ethylene (PTFE) as a bonding material so as to have a weight ratio of 85:10:5 and kneaded while adding a proper amount of distilled water and then rolled to obtain a cathode binder sheet having a thickness of 0.2 mm. Next, the cathode binder sheet is sandwiched between SUS wirenets of 60 mesh as a collecting body and dried under vacuum and pressed to obtain a cathode pole. The battery characteristics of the cathode pole made from $LiMn_2O_4$ powder of Example 1 are evaluated by charge and discharge test. The charge and discharge test is carried out by using a three-pole type glass cell as a cell, using lithium foil as a anode pole and a reference pole, using a mixed solvent of ethylene carbonate and diethyl carbonate containing 1 mol/l of lithium perchlorate therein as an electrolyte and using an upper charge voltage of 4.4 V, a lower discharge voltage of 3.0 V and a charge and discharge rate of 0.5 C (1 C is a rate capable of charging and discharging theoretical capacity in 1 hour). Moreover, the assembling of the cell and charge and discharge test are carried out in a globe box filled with an argon gas of a high purity.

Figure 3:
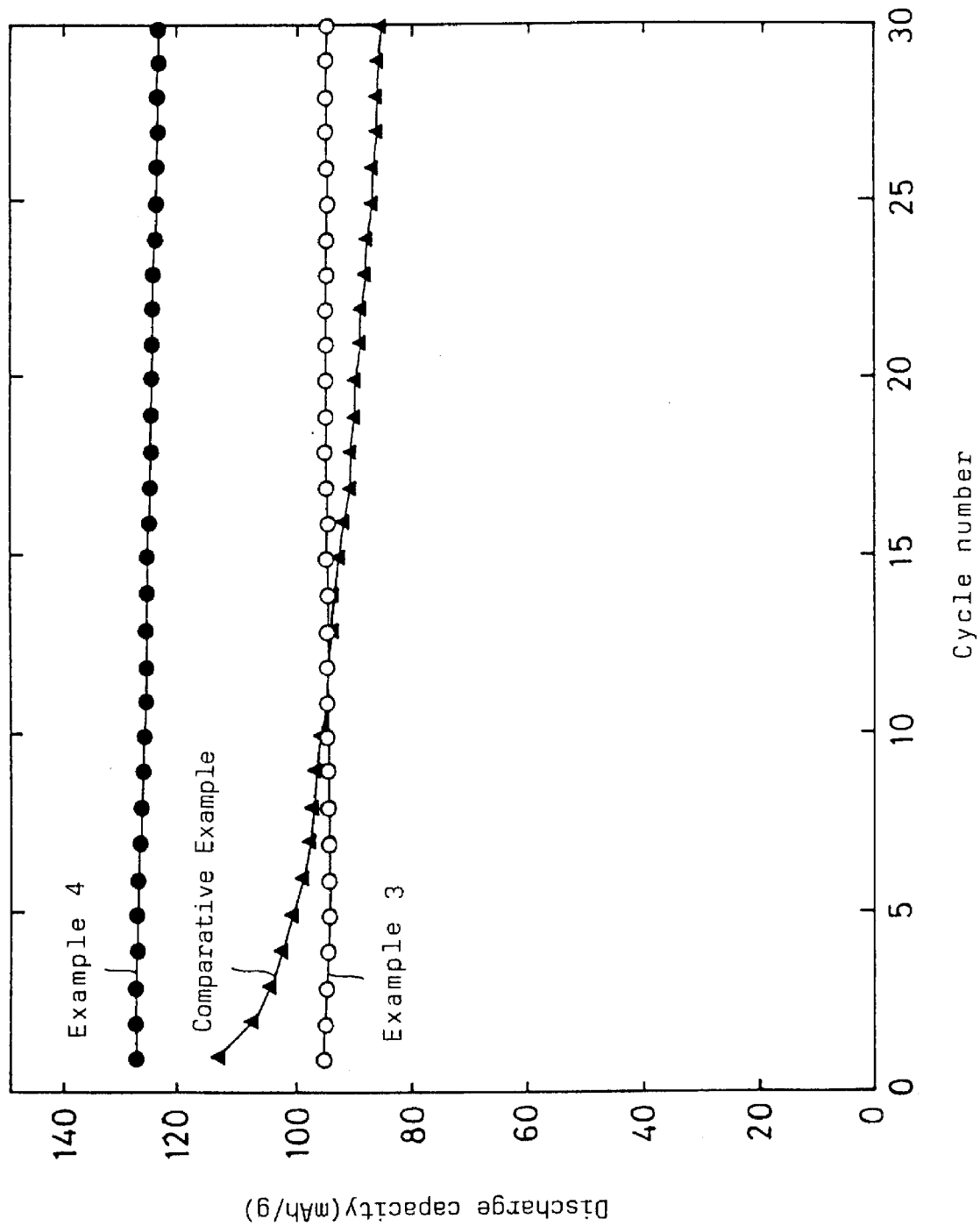
FIG. 3 is a graph showing results of charge and discharge tests in examples.

The thus obtained results of the charge and discharge test are shown in FIG. 3. As seen from the results of this figure, the initial discharge capacity is 95 mAh/g, which exhibits good charge and discharge cycle properties.

(EXAMPLE 4)

The cathode pole is prepared in the same manner as in Example 3 except that the same $LiMn_2O_4$ powder as in Example 1 is subjected to a heat treatment in air at 750° C. for 5 hours, and then the charge and discharge test is carried out.

The thus obtained results of the charge and discharge test are also shown in FIG. 3. As seen from the results of this figure, the initial discharge capacity is 127 mAh/g, which shows good charge and discharge cycle properties. In this case, the reason why the initial discharge capacity is larger than that of Example 3 is considered due to the fact that the heat treating temperature becomes high to make the crystallinity of $LiMn_2O_4$ high and also the secondary particles grow to improve the mixed state with conductor and the utilization ratio of active substance is high.

(COMPARATIVE EXAMPLE)

0.05 mol of commercially available lithium carbonate ($Li_2CO_3$) and 0.2 mol of manganese carbonate ($MnCO_3$) are well mixed in a mortar and fired in air at 800° C. for 5 hours to obtain black powder. This black powder is confirmed to be a single spinel phase of $LiMn_2O_4$ as identified by X-ray diffraction. The same procedure as in Example 3 is repeated by using the thus obtained black powder to prepare a cathode pole, which is subjected to the charge and discharge test.

The thus obtained results of the charge and discharge test are also shown in FIG. 3. As seen from the results of this figure, the initial discharge capacity is 115 mAh/g, but the charge and discharge cycle properties are confirmed to be considerably poor as compared with the case of using $LiMn_2O_4$ obtained by the method according to the present invention.

INDUSTRIAL APPLICABILITY

As mentioned above, according to the method of the present invention, the synthesis of $LiMn_2O_4$ is possible at a temperature lower than that of the conventional technique and also the crystalline spinel type $LiMn_2O_4$ having a considerably larger specific surface area can stably be produced without causing the defects.

Therefore, the spinel type $LiMn_2O_4$ obtained by the method according to the present invention is expected to be used as a cathode material for secondary lithium battery having sufficient charge and discharge cycle properties, a matrix material for lithium adsorbent or the like.

We claim:

1. A method of producing spinel type $LiMn_2O_4$, comprising dissolving water-soluble lithium salt and manganese nitrate $(Mn(NO_3)_2)$ in water and then adding a non-ion water-soluble high polymer containing no metal ion as a cation carried body to the resulting aqueous mixed solution and thereafter removing water from the aqueous mixed solution under heating to synthesize crystalline spinel type $LiMn_2O_4$.

2. The method according to claim 1, wherein non-ion water-soluble high polymer is used as the has OH group.

3. The method according to claim 2, wherein at least one of polyvinyl alcohol, methylcellulose and agar is used as the non-ion water-soluble high polymer.

4. The method according to claim 1, wherein water is removed from the aqueous mixed solution under heating at a temperature of not lower than 100° C.

5. The method according to claim 1, wherein at least one member selected from the group consisting of lithium nitrate, lithium sulfate and lithium chloride is used as the water-soluble lithium salt.

6. The method according to claim 1, wherein lithium nitrate is used as the water-soluble lithium salt.

7. A method of producing spinel type $LiMn_2O_4$, comprising dissolving water-soluble lithium salt and manganese nitrate $(Mn(NO_3)_2)$ in water and then adding non-ion water-soluble high polymer containing no metal ion as a cation carried body to the resulting aqueous mixed solution and thereafter removing water from the aqueous mixed solution under heating to synthesize crystalline spinel type $LiMn_2O_4$ and further subjecting the synthesized $LiMn_2O_4$ to a heat treatment in air.

8. The method according to claim 7, wherein non-ion water-soluble high polymer is used as the has OH group.

9. The method according to claim 8, wherein at least one member selected from the group consisting of polyvinyl alcohol, methylcellulose and agar is used as the non-ion water-soluble high polymer.

10. The method according to claim 7, wherein water is removed from the aqueous mixed solution under heating at a temperature of not lower than 100° C.

11. The method according to claim 7, wherein at least one member selected from the group consisting of lithium nitrate, lithium sulfate and lithium chloride is used as the water-soluble lithium salt.

12. The method according to claim 7, wherein lithium nitrate is used as the water-soluble lithium salt.

13. The method according to claim 7, wherein the heat treatment in air is carried out at a temperature of at least 200° C.

* * * * *

UNITED STATES PATENT AND TRADEMARK OFFICE
CERTIFICATE OF CORRECTION

PATENT NO. : 5,807,532
DATED : September 15, 1998
INVENTOR(S) : K. TAKAHASHI et al.

It is certified that error appears in the above-identified patent and that said Letters Patent is hereby corrected as shown below:

At column 7, line 11 (claim 1, line 3)     delete "a".

At column 7, line 17 (claim 2, line 1)     insert ---the--- before "non-ion".

At column 7, line 18 (claim 2, line 2)     delete "is used as the".

At column 7, line 19 (claim 3, line     after "one" insert ---member selected from the group consisting---.

At column 8, line 10 (claim 8, line 1)     insert ---the--- before "non-ion".

At column 8, line 11 (claim 8, line 2)     delete "is used as the".

On the title page, at item [57], line 11, Abstract, delete". "after"C".

Signed and Sealed this

Second Day of May, 2000

*Attest:*

Q. TODD DICKINSON

*Attesting Officer*     *Director of Patents and Trademarks*